(12) United States Patent
Itoh et al.

(10) Patent No.: US 6,731,094 B1
(45) Date of Patent: May 4, 2004

(54) CONTROLLER FOR BRUSH-LESS MOTORS AND A CONVEYOR SYSTEM HAVING THE CONTROLLERS

(75) Inventors: Kazuo Itoh, Kasai (JP); Toshiyuki Tachibana, Himeji (JP)

(73) Assignee: Itoh Electric Company, Limited (JP)

( * ) Notice: Subject to any disclaimer, the term of this patent is extended or adjusted under 35 U.S.C. 154(b) by 0 days.

(21) Appl. No.: 09/549,993

(22) Filed: Apr. 14, 2000

(30) Foreign Application Priority Data

Apr. 21, 1999 (JP) .......................................... 11-113718

(51) Int. Cl.[7] ............................... H02P 5/28; H02P 7/36
(52) U.S. Cl. ...................... 318/727; 318/138; 318/254; 318/432; 318/434; 318/439; 318/722; 318/724
(58) Field of Search ................................ 318/722, 723, 318/724, 727, 138, 439, 254, 432, 434

(56) References Cited

U.S. PATENT DOCUMENTS

| | | | | |
|---|---|---|---|---|
| 4,438,398 A | * | 3/1984 | Maruo et al. ................ | 324/173 |
| 4,879,502 A | * | 11/1989 | Endo et al. .................. | 318/723 |
| 4,924,161 A | * | 5/1990 | Ueki et al. .................. | 318/567 |
| 5,186,308 A | * | 2/1993 | Munro ........................ | 198/572 |
| 5,318,167 A | * | 6/1994 | Bronson et al. ............ | 198/577 |
| 5,359,154 A | * | 10/1994 | Tsukasa et al. ............. | 177/145 |
| 5,850,130 A | * | 12/1998 | Fujisaki et al. ............. | 318/439 |
| 6,021,888 A | * | 2/2000 | Itoh et al. .................... | 198/783 |
| 6,043,624 A | * | 3/2000 | Masaki et al. .............. | 318/723 |
| 6,184,647 B1 | * | 2/2001 | Oguro et al. ................ | 318/727 |
| 6,244,421 B1 | * | 6/2001 | Hall ........................ | 198/460.1 |
| 6,459,224 B2 | * | 10/2002 | Itoh et al. .................... | 318/445 |

FOREIGN PATENT DOCUMENTS

EP          1047182 A1  * 10/2000  ............. H02P/6/08

* cited by examiner

*Primary Examiner*—Robert Nappi
*Assistant Examiner*—Tyrone Smith
(74) *Attorney, Agent, or Firm*—Wood, Phillips, Katz, Clark & Mortimer (57) ABSTRACT

Object of the present invention is to distribute signals indicating angular position of a rotor from a controller for a brush-less motor to another control device.

A controller for driving a brush-less motor has a magnetic-pole detecting circuit (9) that receives from a Hall-effect semiconductor disposed in a motor roller (4) sequential (pole position-representing) signals relating to a rotor's position. These signals are converted into pulses and then supplied to a current-controlling circuit (8), so that currents to stators are controlled based on the signals from the detecting circuit (9) so as to drive the motor roller. A sequencer (20) supplies to a controlling circuit (7) "ON/OFF" and other commands, that are then processed in this circuit and fed to the current-controlling circuit (8) for driving the motor. A pulse generator (19) receives from the semiconductor the pole position signals and convert them into pulses, that are then output to an external terminal (11*a*) from which they are sent to a superordinate external controller, so that the latter can receive rotation data from the brush-less motor controller.

16 Claims, 5 Drawing Sheets

CONTROLLER FOR BRUSH-LESS MOTORS AND A CONVEYOR SYSTEM HAVING THE CONTROLLERS

FIELD OF THE INVENTION

The present invention relates to a controller for driving a brush-less motor, and also to a conveyor system having the controllers.

BACKGROUND OF THE INVENTION

Figure 5:
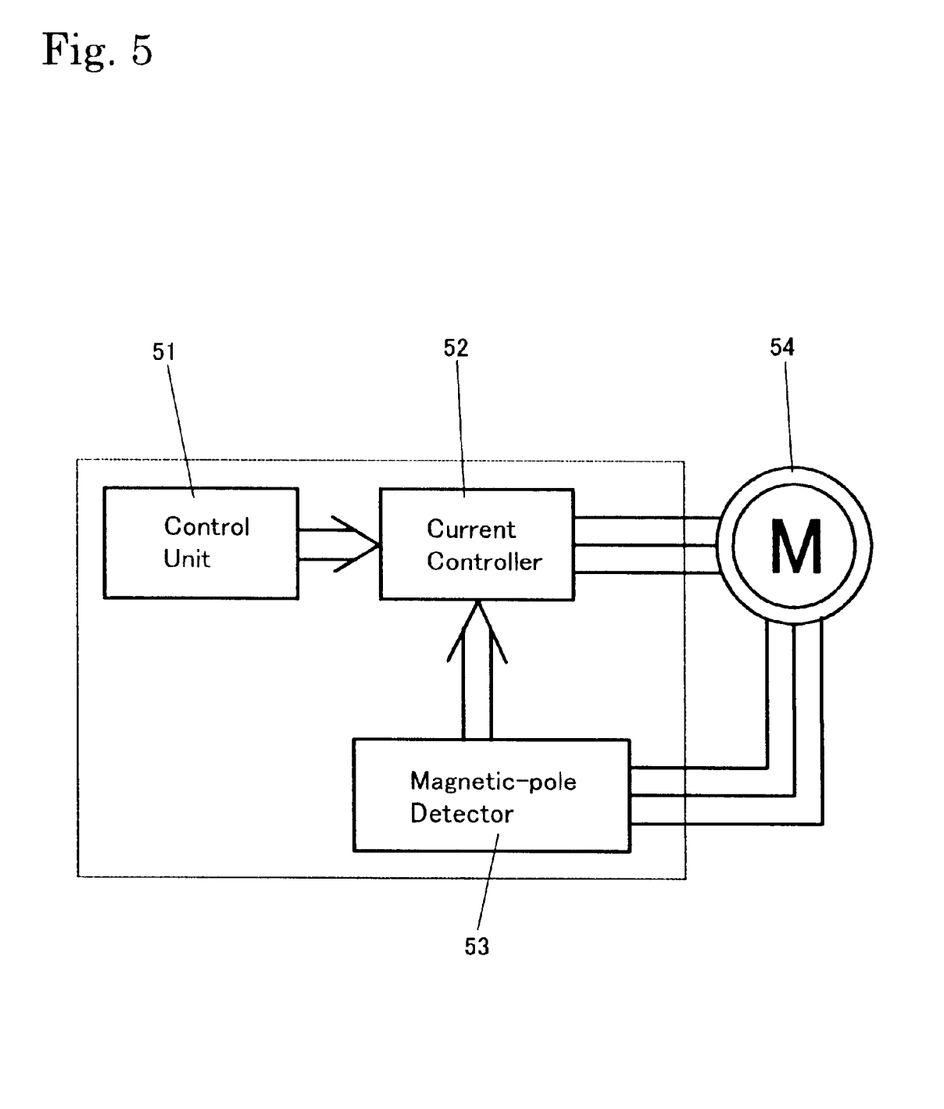
FIG. 5 is a block diagram of the prior art circuit in brush-less motor controllers known in the art.

FIG. 5 is a block diagram illustrating the prior art controller for driving the brush-less motor. This controller comprises a control unit 51, an electric-current controller 52 and a magnetic-pole detector 53. In general, the brush-less motor 54 comprises a plurality of stators each consisting of an electromagnet, a rotor with magnetic poles, and a plurality of magnetic-pole sensors for sensing the angular position of the rotor's magnetic poles. Hall-ICs are widely used as such sensors. Each of them is provided in the form of a single package in which a Hall-effect semiconductor, an amplifier for amplifying a weak signal output from the semiconductor, a Schmidt-trigger circuit converting the amplified signal into a square wave, a power regulator circuit and a temperature compensation circuit.

The control unit 51 receives control signals from a superordinate device such as a sequencer or a central computer. These control signals will be processed in a prescribed manner, before supplied to the current controller 52. The control signals output from the superordinate device include those which turn on or off the brush-less motor 54, change rotational speed thereof and/or switch over the direction of its rotation from forward to reverse, or vice versa.

The magnetic-pole detector 53 successively receives from the Hall-effect semiconductor a series of signals (i.e., polar signals) representing the angular position (viz., rotational phase) of the poles-carried by the rotors. Those signals will thus be converted into pulse waves, before supplied to the current controller 52.

The current controller 52 treats with both the processed signals delivered thereto from the control unit 51 and pole detector 53, according to a given program. Consequently, an electric current that is being applied to each of those stators built in the brush-less motor 54 will thus be turned on or off and/or adjusted in intensity so that the motor rotates at command of the controller 52.

The brush-less motor as summarized above may be used for example as a prime mover in a roller conveyor. The present applicant has been developing a conveyor system comprising a drive roller provided with a built-in brush-less motor, as disclosed in the Japanese Patent Laying-Open Gazette No. 10-279047.

In general, a plurality of brush-less motors have to be incorporated in each of the conveyor systems of this type, and each motor necessitates a controller of the described structure. In order to exactly transport articles along the conveyor, a superordinate control device will output command signals to the respective controllers.

Where there is any need to control the conveyor system in a more sophisticated manner or more accurately, it may be feasible to enrich and enhance the functions of each motor controller. In detail, a microcomputer and/or complicated logic circuits may be built in the controller, for that purpose.

If however those many controllers in each conveyor system had to be so highly functional apparatuses, then an overall manufacture cost of the whole system would rise to an intolerable extent.

Objects of the present invention are therefore to provide a brush-less motor with a functional, accurate and inexpensive controller, as well as a conveyor system comprising such a brush-less motor.

SUMMARY OF THE INVENTION

In accordance with the present invention, a controller for a brush-less motor that comprises stators and a rotor will be constructed to be of such a structure that signals indicating or representing angular position of the rotor are utilized to control electric currents applied to the stators, and characterized in that those signals output from the motor are preliminarily converted into a series of pulses.

In this controller, the pulse wave signals representing the rotor's changing angular position are successively output to be processed subsequently, whereby various controls can be done in and by a superordinate control device receiving those signals and on the basis thereof, without aid of any rotary encoder, any tachometer or the like. Such a character of the present system is advantageous in that each motor controller can be driven accurately and without raising overall construction cost of the system. The "overseeing device in charge of sophisticated controls" (viz., the superordinate control device) is thus separated from respective controllers for the brush-less motors. By virtue of this feature, those individual motor controllers are not only rendered inexpensive but also possible to quickly and immediately feed to the overseeing device the data on angular positions of the rotors, thus enabling the whole control system to be designed more freely and in a shorter time.

A conveyor system also provided herein comprises a central controller such as a sequencer or a controlling computer, and a plurality of roller conveyor units each composed in turn of a row of transverse rollers on and along which any desired articles are transported. Each conveyor unit comprises at least one brush-less motor for driving one of the transverse rollers and a controller for controlling the brush-less motor composed of stators and a rotor, wherein signals representing angular position of the rotor are utilized to control electric currents applied to the stators in such a manner that those signals output from the motor are preliminarily converted into pulse waves. This structure of the invention is applicable to a conveyor system in which the brush-less motor is built in the one transverse roller so as to form a "motor roller".

In this conveyor system, an electronic circuit constituting each motor controller can be rendered simpler but capable of taking signals representing rotational speed of the brush-less motor, so that whatever manner or type of control can be done in compliance with the wishes of users. The central controller may receive and process the rotational speed signals to produce an overseeing command signal. Further, any intermediate controller such as a feedback control box or a master control box may intervene between the central controller and the individual terminal motor controllers. In this case, the intermediate controller will receive the overseeing signal from the central controller and the rotational speed signals from the terminal controllers so that a subordinate signal may be produced and fed thereto. Any other fashion of the system can also be employed herein to meet requirements from the users.

DETAILED DESCRIPTION OF THE INVENTION

In embodiments of the present invention, a controller for a brush-less motor comprising stators and a rotor will be constructed to be of such a structure that signals indicating or representing angular position of the rotor are utilized to control electric currents applied to the stators, and characterized in such that either basic signals representing angular position of the rotor or pulse signals produced from the basic signals to represent rotational speed of the rotors will be output to a rotational signal-outputting terminal. This rotational signal-outputting terminal may be attached directly to a circuit board, or alternatively connected thereto by leads.

The basic signals representing angular position of the rotor may be signals output from a magnetic-pole detecting sensor or sensors, and the latter may be any conventional elements or devices such as Hall-effect ICs known in the art. Usually, a few or several magnetic-pole detecting sensors are incorporated in each of the brush-less motors so that they generate series of pulse signals that are synchronous each with rotational cycle of the rotor. The series of pulse signals from the different sensors are shifted at given regular intervals in phase from each other. Thus, the basic signals from only one selected from those magnetic-pole detecting sensors will suffice to produce the pulse signals representing the rotational speed of the rotor.

In more detail, the controller for the brush-less motor may be of the following structure. Namely, the motor has the stators each being an electromagnet, with the rotor having a permanent magnet with magnetic poles. The motor further comprises a plurality of magnetic-pole sensors for detection of angular positions of the magnetic poles. The controller may be composed of a controlling circuit, a current-controlling circuit, a magnetic-pole detecting circuit and the rotational signal-outputting terminal. The controlling circuit receives control signals from a superordinate or overseeing device and processes these control signals in a prescribed manner. The magnetic-pole detecting circuit receives and processes signals being output from the magnetic-pole sensors. The current-controlling circuit will receive signals having been processed in the controlling circuit and the detecting circuit so that electric currents are supplied to the stators in a sequential manner. The rotational signal-outputting terminal may be electrically connected to one of outputting wires from the magnetic-pole sensors. Each of these controlling circuit, magnetic-pole detecting circuit and current-controlling circuit may principally be of any electronic structure known in the art and may be modified in any conventional manner by circuit designers. Preferably, an amplifier will be interposed between the rotational signal-outputting terminal and the one outputting wire from the magnetic-pole sensor.

A conveyor system of the invention may comprise a central controller and a plurality of roller conveyor units each composed of a row of transverse rollers on and along which any desired articles are transported. Each conveyor unit comprises at least one brush-less motor for driving one of the transverse rollers and an individual controller for controlling the brush-less motor. The brush-less motor is composed of stators each being an electromagnet, and a rotor having a permanent magnet with magnetic poles. The motor further comprises a plurality of magnetic-pole sensors for detection of angular positions of the magnetic poles. The individual controller may be composed of a controlling circuit, a magnetic-pole detecting circuit, a current-controlling circuit and a rotational signal-outputting terminal. The controlling circuit receives control signals from the central controller serving as a superordinate or overseeing device and processes these control signals in a prescribed manner. The magnetic-pole detecting circuit receives and processes signals being output from the magnetic-pole sensors. The current-controlling circuit will receive signals having been processed in the controlling circuit and the detecting circuit so that electric currents are supplied to the stators in a sequential manner. The rotational signal-outputting terminal may be electrically connected to one of outputting wires from the magnetic-pole sensors. Signals being output from these rotational signal-outputting terminals in the individual motor controllers will be supplied to the central controller.

In an alternative mode of the present invention, a conveyor system comprises a central controller and a plurality of roller conveyor units each composed of a row of transverse rollers on and along which any desired articles are transported. Each conveyor unit comprises at least one brush-less motor for driving one of the transverse rollers and an individual controller for controlling the brush-less motor. The brush-less motor is composed of stators each being an electromagnet, and a rotor having a permanent magnet with magnetic poles. The motor further comprises a plurality of magnetic-pole sensors for detection of angular positions of the magnetic poles. The individual controller may be composed of a controlling circuit, a magnetic-pole detecting circuit, a current-controlling circuit and a rotational signal-outputting terminal. The controlling circuit receives control signals from the central controller serving as a superordinate or overseeing device and processes these control signals in a prescribed manner. The magnetic-pole detecting circuit receives and processes signals being output from the magnetic-pole sensors. The current-controlling circuit will receive signals having been processed in the controlling circuit and the detecting circuit so that electric currents are supplied to the stators in a sequential manner. The rotational signal-outputting terminal may be electrically connected to one of outputting wires from the magnetic-pole sensors. The conveyor system is composed of transportation lines each being a row of the roller conveyor units and each having a master control box. Signals from the central controller will be input into the master control boxes so that these signals themselves or modified signals produced by processing them are fed to the controlling circuits for the individual motor controllers. Those master control boxes are electrically connected to the respective motor controllers in such a way as enabling control of this mode. In this case, signals being output from those rotational signal-outputting terminals in the individual motor controllers will be supplied to the master control boxes, with the rotational signal-outputting terminal being connected to the respective master control boxes.

In the conveyor system just described above, original signals are output from the rotational signal-outputting terminals in the individual motor controllers. Those original signals are possibly processed subsequently to produce modified signals based on said original signals, and it is preferable to input those original or modified signals into the central controller. There may be provided wiring branches formed in series or in parallel with each other so as to deliver either the original signals or the modified ones to the central controller. A network may be formed in any manner known in the art in order to connect the motor controllers included in the transportation line or lines.

Feedback control based on the signals from said rotational signal-outputting terminals may be employed to feed the signals into the respective controlling circuits in the individual motor controllers. An intermediate control device interposed between the main or central controller and the individual controllers, or the central controller itself, may execute such a feedback control.

THE PREFERRED EMBODIMENTS

Now, some embodiments will be described with reference to FIGS. 1 to 4.

Figure 1:
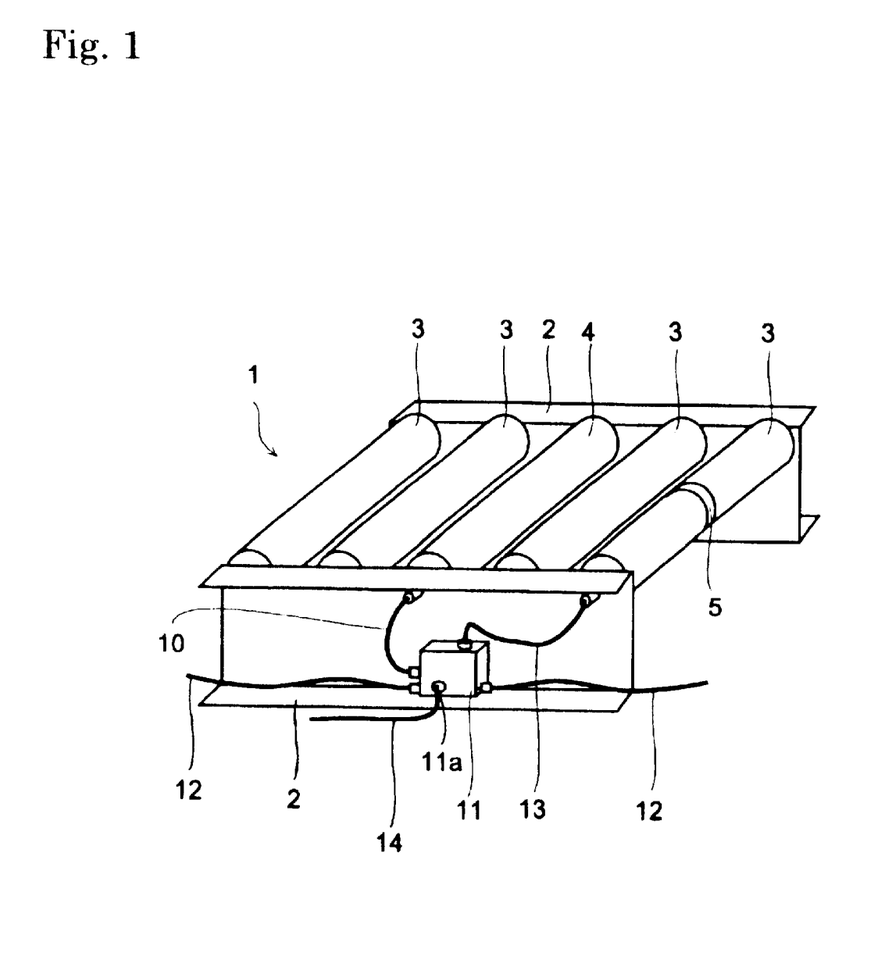
FIG. 1 is a perspective view of a conveyor unit on which a controller provided herein for a brush-less motor is disposed.
Figure 2:
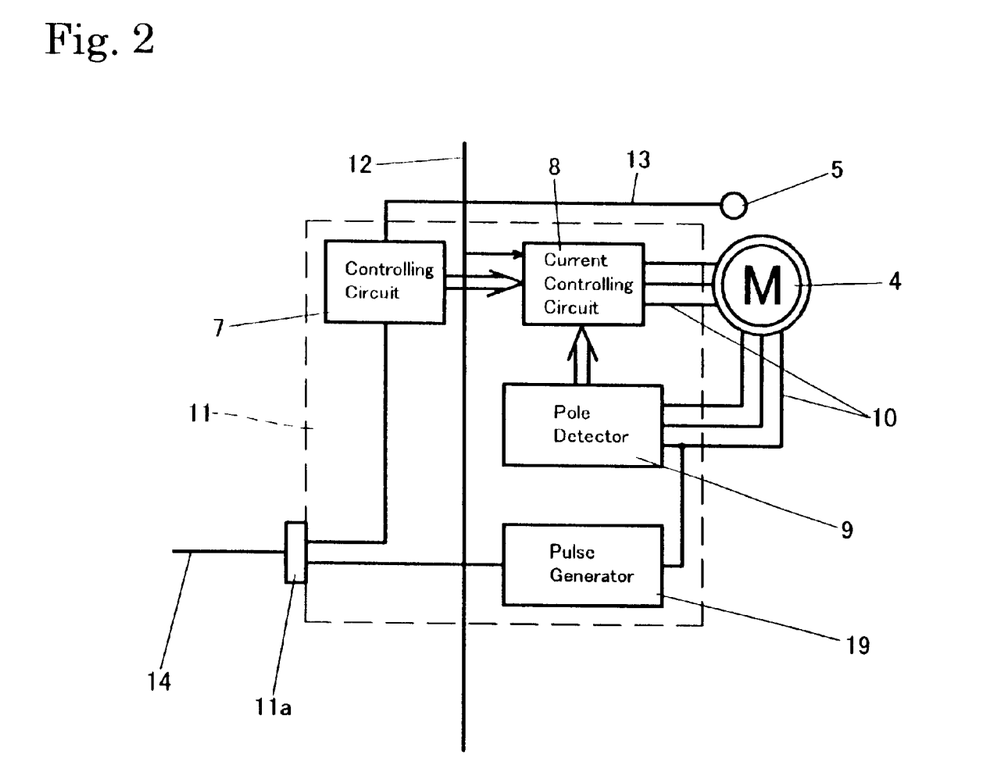
FIG. 2 is a block diagram of the brush-less motor controller having an electric circuit provided in an embodiment.
Figure 3:
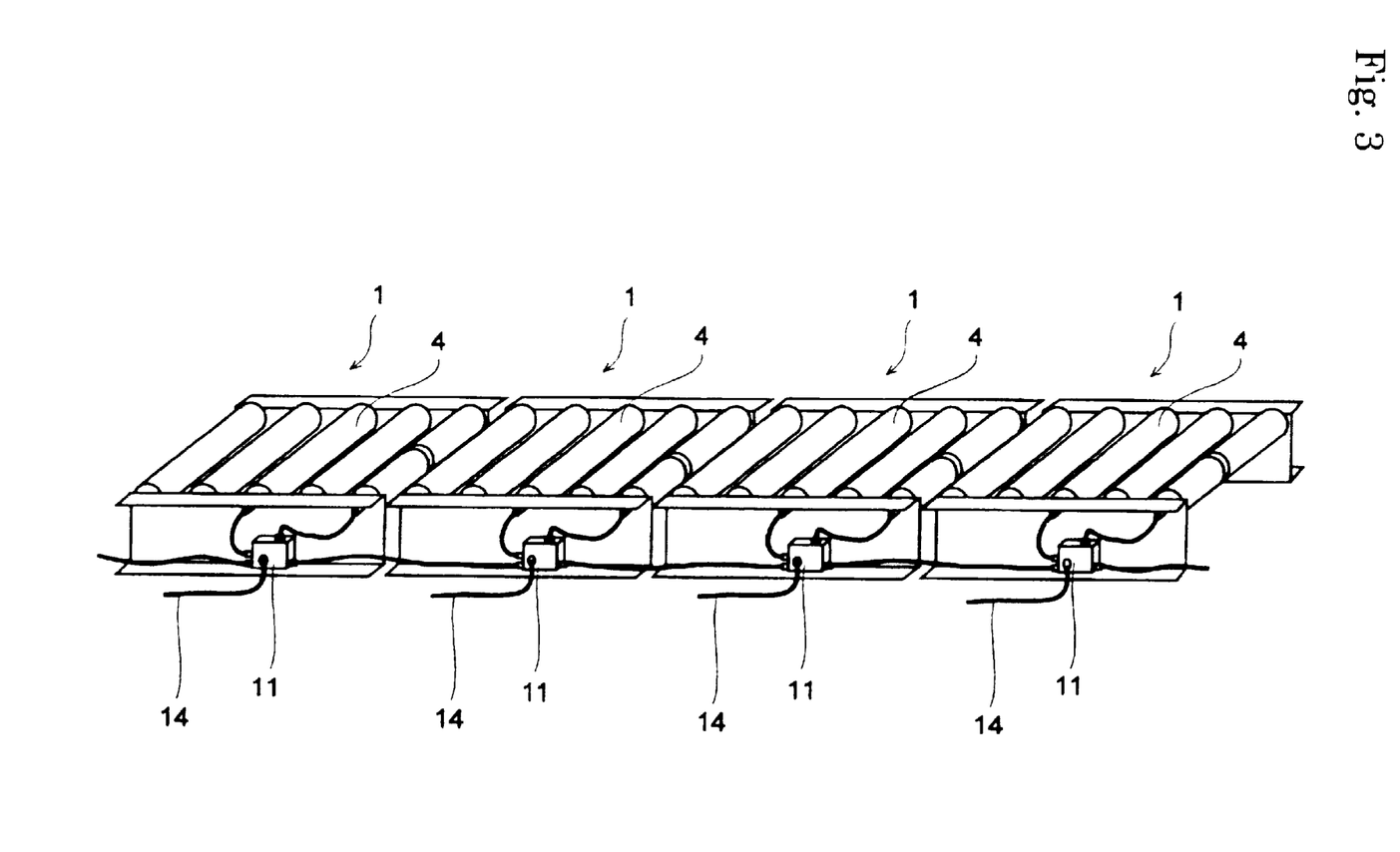
FIG. 3 is a perspective view of a conveyor line consisting of a series of the conveyor units connected together.
Figure 4:
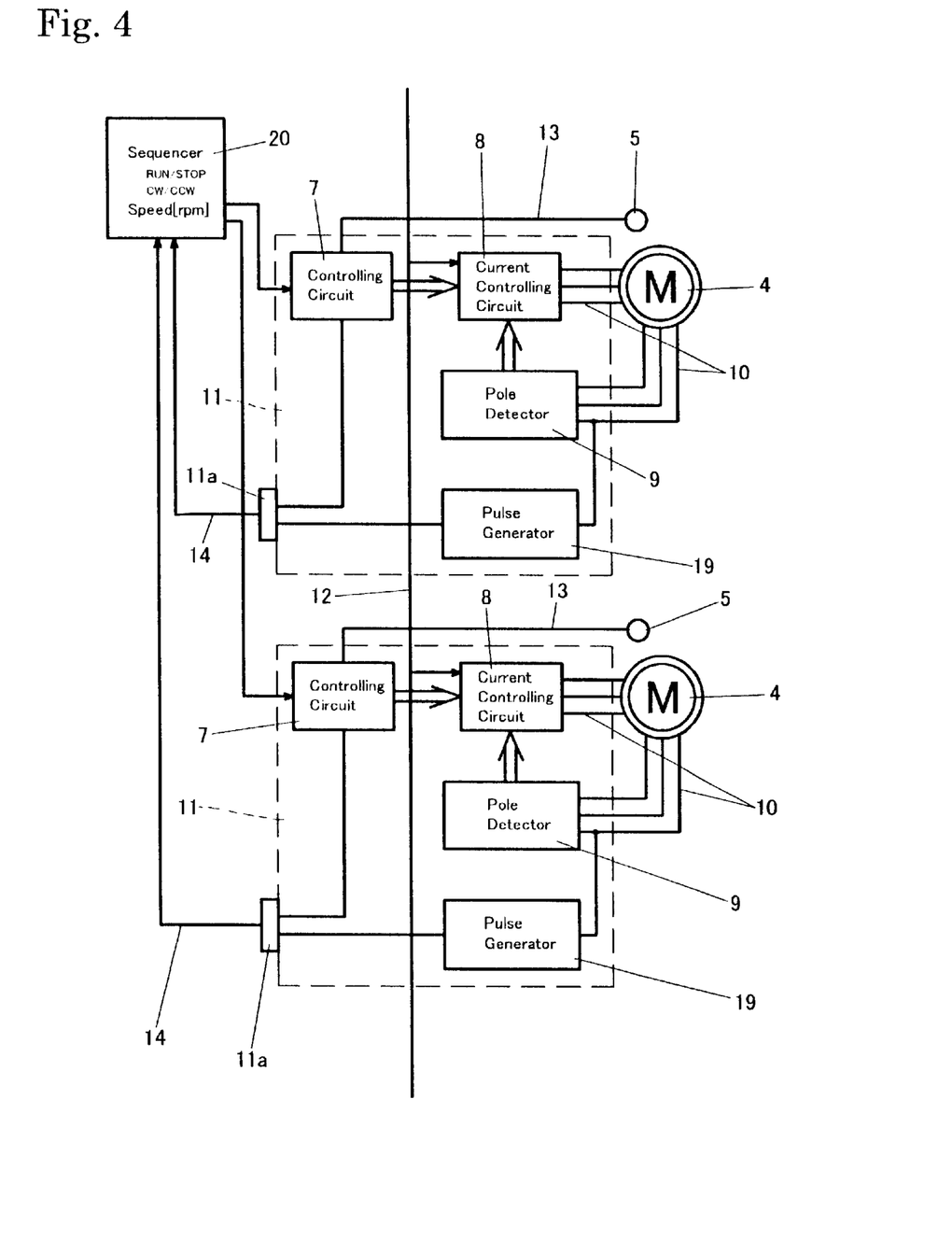
FIG. 4 is a block diagram of a wiring between the conveyor units respectively having the electric circuits.

FIG. 1 is a perspective view of a conveyor unit on which a controller provided herein for a brush-less motor is disposed. FIG. 2 is a block diagram of the brush-less motor controller having an electric circuit provided in an embodiment. FIG. 3 is a perspective view of a conveyor line consisting of a series of the conveyor units connected together. And FIG. 4 is a block diagram of a wiring between the conveyor units respectively having the electric circuits.

In these embodiments, each of motor controllers provided in the embodiments will control each corresponding roller that has a brush-less motor built in it. The motor roller is incorporated in a conveyor unit as one part thereof for forcing any article to advance on and along the conveyor unit.

As shown in FIG. 1, the conveyor unit 1 consists of a plurality of transverse rollers 3 and 4 rotationally held between a pair of side parallel rails 2 and 2. The rollers 3 are idle rollers capable of freely rotating, and the other roller 4 is the motor roller. This motor roller 4 has a shaft secured to the side rails 2. Bearings are disposed on opposite ends of the shaft so as to support a drum member serving as a transporting roller rotationally around the shaft. A plurality of stators each consisting of an electromagnet are fixed on and integral with the shaft, and a rotor facing the stators is fixed in turn on an inner periphery of the drum member. An annular permanent magnet is attached to the rotor so that the changing positions (viz., rotational state) of magnetic poles of this magnet are detected by a Hall-effect semiconductor attached to the stator and sequential signals (i.e., pole position signals) are output therefrom. A cord 10 is composed of leads for receiving the pole position signals and further leads for supplying power to the stators. The cord placed in an axial bore of the shaft extends outwards from one end thereof.

The motor roller 4 is located mid in the conveyor unit 1, between the idle rollers 3. One of the idle rollers 3 is selected to hold an article-detecting sensor 5 built in it. The number and arrangement of the motor rollers 4 and idle rollers 3 are not necessarily be restricted to those which are illustrated in the drawings, but may be changed in any proper manner. The article-detecting sensor 5, that may be a contact sensor embedded in an outer periphery of the roller's drum, can be built in the motor roller 4. A lead 13 extending through a bore of the shaft protrudes out from an end thereof.

Connected to the brush-less motor controller 11 are a main power supply line 12 (for example a DC 24V line), the cord 10 and the lead 13. A lead line (transmission wire) 14 is connected to an external terminal 11a of this motor controller 11. Substantially, the brush-less motor controller 11 consists of a controlling circuit 7, a current-controlling circuit 8, a magnetic pole detecting circuit 9 and a pulse generating circuit 19, as seen in FIG. 2. The Hall-effect semiconductor on the shaft of motor roller 4 gives to the pole detecting circuit 9 sequential signals (viz., pole position signals) indicating the position (i.e., rotational state) of rotor. These signals will be processed into pulses input in the current-controlling circuit 8, so that this circuit having received the processed signals from the detecting circuit 9 drives the motor roller 4 with controlled electric currents supplied to the stators. The controlling circuit 7 gives command signals to the current-controlling circuit 8 so as to switch on or off the currents supplied to the motor roller 4 (thus driving it or stopping it). The command signals which the controlling circuit 7 gives to the current-controlling circuit 8 will also cause it to adjust the currents (for driving the motor roller in a forward or reverse direction and for changing its rotational speed).

The pulse generating circuit 19, which may comprise an amplifier, will receive from the Hall-effect semiconductor the sequential signals (viz., pole position signals) indicating the position (i.e., rotational state) of rotor and consequently produce output signals in the form of pulses. These output pulse signals will then be sent to the external terminal 11a, from which the lead line 14 extends to a sequencer 20. This sequencer 20 (serving as an superordinate control system) that judges and acts for control of the rotational condition of motor roller 4 may be regarded as an overseeing system giving commands to the individual brush-less motor controllers 11. Thus, the superordinate sequencer 20 obtains directly from the individual controllers 11 such data as indicating rotational condition or state of the motor roller 4, without needing any rotary encoder, any tachometer or the like.

As shown in FIG. 3, conveyor units 1 each of the described structure may be connected one to another to form a transportation line. FIG. 4 shows an electrical relationship established between those conveyor units 1 in the conveyor line. Lead lines 14 operate to send data between the superordinate sequencer 20 and the controlling circuits 7 respectively constituting the individual controllers 11 for brushless motors. The sequencer 20 will order the controlling circuits 7 with command signals such as a driving/ stopping signal (i.e., "RUN/STOP" in the drawings), a signal commanding the motor roller to rotate forward or reversely (i.e., "CW/CCW" in the drawings) and a signal for changing rotational speed (i.e., "SPEED [rpm]" in the drawings), all produced along prescribed routines. If for example a signal commanding forward rotation is output from the sequencer 20, then the motor rollers 4 in the respective conveyor units I will rotate forward to transport the articles lying thereon in a normal forward direction. If the sequencer 20 outputs any signal for changing speed, then motor rollers 4 in the respective units 1 will rotate at a newly ordered rotational speed, causing the conveyor line to transport the articles at a desired linear velocity.

The sequencer 20 will also receive through the lead lines 14 signal pulses indicating the motor roller's 4 rotation in each conveyor unit 1, the signal pulses being utilized to perform necessary data processings to execute various controls. It may be judged whether or not any difference exists between the speeds of the motor rollers 4 included in the conveyor line, and if judged 'Yes', then the sequencer will output a renewed speed command for eliminating such a difference. If, in spite of a "RUN" command having been output to rotate any motor roller, any pulses were not detected therefrom, then the sequencer would regard the system as being out of order.

Further, the sequencer 20 will receive through the lead lines 14 some signals indicating presence of the article on the article-detecting sensor 5, so as to be capable of doing the following control. Upon reception from the sensor 5 a signal indicating its detection of the article, counting of the pulses output from the pulse generating circuit 19 will start for the subject brush-less motor controller 11. A "STOP" command will thus be given to the motor roller of the conveyor unit 1 to stop at a time when the counts have reached a prescribed number. In the event that conveyor unit 1 were stopped immediately when the sensor 5 had detected the article, it would simply be stopped at a region trailing upstreamly from the sensor. The article can however in the embodiment be stopped at any desired downstream location ahead the sensor 5. This feature is advantageous in that degree of freedom is increased in selecting the position where each article has to stop, and thus any users or operators of this system can easily and readily change such position merely by alteration of the target number of said counts.

The number of pulses from the pulse generator 19 may continuously be counted and monitored after the "RUN" command has been issued. In this case, a distance which the article has advanced, in other words a current position thereof, can be determined dispensing with such a position detecting sensor 5.

In stopping the article on the conveyor, linear momentum of the article and/or rotational momentum of the motor roller 4 itself will possibly cause it to stop after its several rotations by inertia. In order to compensate such a deviation of the article from the desired stopping position, any of the following coutermeasures may be taken. For example, pulses from the pulse generator 19 in the motor controller 11 will be counted until the article stands still, after the "STOP" command has been given to the conveyor unit 1. The number of pulses thus counted will indicate a distance which the article has moved ahead and beyond the desired stopping position. Any proper machine or apparatus (such as an inspection, processing or transferring apparatus) not shown may be employed to receive the counts of pulses, or the motor roller 4 itself in the conveyor unit 1 may be driven backward, so as to correct the actual position of the article. Alternatively, a proper dynamic braking mechanism may be employed also to avoid undesired excessive rotation that the motor roller 4 is prone to make by inertia.

It will now be apparent that the brush-less motor controller 1 is designed such that signals representing the position of rotor are converted into pulses to be processed outside the controller, in order to dispense with a rotary encoder, a tachometer or the like. The sequencer 20 employed herein as an additional or foreign control apparatus receives from the controller 11 a series of data relating to the rotational speed of motor roller 4, for execution of various controls, thus lowering cost needed for incorporation of additional apparatuses.

Calculation using pulses generated since the "RUN" command issued from the sequencer 20 will be effective to determine a load (viz., weight) which the article impart to the conveyor. This possibility gives a benefit that the articles advancing on a branched line may be distributed, sorted by weight, to corresponding destinations along the branches.

Any article coming onto the conveyor unit 1 while its motor roller 4 stands still will cause forced rotations thereof, producing pulses enabling the article to be detected.

The controllers 11 for brush-less motors may be composed only of fundamental and common parts (thus adapted to be widely used, lacking special controlling parts). Such a design will make it possible to manufacture the controllers on a large scale and with a lowered cost. Users may use the external terminal 11a on the controller 11, for taking out signal pulses for use in any freely designed composite systems. In other words, the overseeing superordinate parts (viz., additional foreign control components) separated from each brush-less motor controller 11 will render it inexpensive, while ensuring that the latter can give the former in real time any necessary data or information representing rotation of the motor roller. Therefore, any whole control system can be designed more freely and more speedily.

Although the article-detecting sensor is built in the roller in the described embodiments, photoelectric sensors or the like may be disposed on the side frames 2 so as to substitute for the built-in sensor. The brush-less motor may not necessarily be incorporated in the roller, but be disposed outside the roller and mechanically connected thereto. Further, the motor controller may be utilized to control any brush-less motors other than those employed in the conveyor units. The Hall-effect semiconductors magnetically detecting rotational state of the rotor may be replaced with any compatible optical means or the like.

In summary, the brush-less motor controller of the invention is designed such that signals representing the position of rotor are converted into pulses to be processed outside the controller, in such a manner that a rotary encoder, a tachometer or the like is dispensed with. An additional foreign control component can nevertheless receive from the controller all the necessary data relating to rotational speed of the motor roller, when executing various controls within said component thus rendered inexpensive. The overseeing superordinate parts (viz., additional foreign control components) is separated from each brush-less motor controller 11 so as to render it inexpensive, while ensuring that the latter can provide the former in real time with any necessary data indicating rotation of the motor roller. Therefore, any whole control system can be designed more freely and more speedily, as compared with integral systems each comprising all the necessary parts arranged therein.

We claim:

1. A control system for a first brush-less motor comprising stators and a first rotor and a second brush-less motor comprising stators and a second rotor, said control system constructed so that signals representing angular position of the first and second rotors are utilized to control electric currents applied to the stators on the first and second brush-less motors, the control system further comprising a sequencer, a first controller, and a second controller, the first controller having a first rotational signal-outputting terminal, wherein signals selected from the group consisting of (a) basic signals representing angular position of the first rotor and (b) signals representing rotational speed of the first rotor are output from the first controller through the first rotational signal-outputting terminal so as to be taken therefrom out of the first controller and processed by the sequencer, said second controller having a second rotational signal-outputting terminal, wherein signals selected from the group consisting of (a) basic signals representing angular position of the second rotor and (b) signals representing rotational speed of the second rotor are output from the second controller through the second rotational signal-outputting terminal so as to be taken therefrom out of the second controller and processed by the sequencer, wherein the sequencer can process the signals from the first and second rotational signal-outputting terminals to coordinate operation of the first and second motors through the first and second controllers.

2. A control system for first and second brush-less motors, said first brush-less motor comprising stators and a first rotor, said second brush-less motor comprising stators and a second rotor, the control system comprising:

(A) a first controller comprising:
  (i) a first controlling circuit;
  (ii) a first magnetic pole detecting circuit;
  (iii) a first current-controlling circuit; and
  (iv) a first rotational signal-outputting terminal,
the first magnetic pole detecting circuit and first current-controlling circuit defining a first closed loop;

(B) a second controller comprising;
  (i) a second controlling circuit;
  (ii) a second magnetic pole detecting circuit;
  (iii) a second current-controlling circuit; and
  (iv) a second rotational signal-outputting terminal,
the second magnetic pole detecting circuit and second current-controlling circuit defining a second closed loop; and (C) a sequencer,
  wherein:
    (a) at least one of (I) first basic signals representing angular position of the first rotor and (II) pulse signals produced from the first basic signals that are representative of rotational speed of the first rotor are output outside of the first loop from the first rotational signal-outputting terminal to the sequencer to be processed by the sequencer, and
    (b) at least one of (I) second basic signals representing angular position of the second rotor and (II) pulse signals produced from the second basic signals that are representative of rotational speed of the second rotor are output outside of the second loop from the second rotational signal-outputting terminal to the sequencer to be processed by the sequencer,
whereby the sequencer coordinates operation of the first and second motors respectively through the first and second controllers as dictated by the signals outputted by the first and second signal-outputting terminals.

3. A control system as defined in claim 2 wherein the first rotor has a permanent magnet with magnetic poles and a plurality of magnetic pole sensors for detection of angular position of the magnetic poles and the first rotational signal-outputting terminal is electrically connected to an output wire extending from the magnetic pole sensors, the control system further comprising an amplifier interposed between the first rotational signal-outputting terminal and the outputting wire from the magnetic-pole sensor.

4. The control system as defined in claim 2 wherein the first controller comprises a pulse generator for directing signals from the first controller through the first rotational signal-outputting terminal to the sequencer.

5. The control system as defined in claim 2 wherein the first brush-less motor comprises a shaft with a Hall-effect semiconductor on the shaft which directs signals to the first magnetic-pole detecting circuit indicative of a position of the first rotor.

6. The control system as defined in claim 5 wherein the signals generated by the shaft are processed into pulses input into the first current-controlling circuit, which in turn controls electric current supplied to the stators on the first motor.

7. The control system as defined in claim 6 wherein the controlling circuit directs command signals to the first current-controlling circuit so as to switch on or off current supplied to the first rotor.

8. The control system as defined in claim 2 wherein the sequencer causes signals to be directed to the first and second brush-less motors that are one of a drive and stop signal.

9. The control system as defined in claim 2 wherein the sequencer causes signals to be directed to the first and second brush-less motors that are one of a rotate clockwise and counterclockwise signal.

10. The control system as defined in claim 2 wherein the sequencer causes signals to be directed to the first and second brush-less motors that are speed variation signals.

11. The control system according to claim 1 in combination with a plurality of rollers that are rotatable to advance articles supported on the rollers and the first brush-less motor is operatively connected to drive one of the rollers in the plurality of rollers and the second brush-less motor is operatively connected to drive another of the rollers in the plurality of rollers.

12. The control system according to claim 2 in combination with a plurality of rollers that are rotatable to advance articles supported on the rollers and the first brush-less motor is operatively connected to drive one of the rollers in the plurality of rollers and the second brush-less motor is operatively connected to drive another of the rollers in the plurality of rollers.

13. A controller for a motorized roller comprising a roller body and a brush-less motor accommodated in the roller body, the brush-less motor comprising stators and a rotor constructed so that signals representing angular position of the rotor are utilized to control electric current supplied to the stators,
the controller having a rotational signal-outputting terminal,
wherein signals selected from the group consisting of a) basic signals representing angular position of the rotor and b) pulse signals produced from the basic signals to represent rotational speed of the rotor, are output to the rotational signal-outputting terminal so as to be taken therefrom out of the controller.

14. The controller according to claim 13, wherein the controller comprises a controlling circuit which at least one of a) switches on/off current supplied to the motor and b) adjusts the current to drive the motor in a forward or reverse direction.

15. The controller according to claim 13, wherein the controller comprises a controlling circuit which at least one of a) switches on/off current supplied to the motor and b) adjusts the current to change the rotational speed of the motor.

16. The controller according to claim 13 further in combination with a sequencer for controlling operation of at least the brush-less motor using the signals from the signal-outputting terminal.

* * * * *